(12) United States Patent
Fuglsang et al.

(10) Patent No.: US 8,579,594 B2
(45) Date of Patent: Nov. 12, 2013

(54) WIND TURBINE BLADE WITH SUBMERGED BOUNDARY LAYER CONTROL MEANS

(75) Inventors: Peter Fuglsang, Vejle (DK); Stefano Bove, Lunderskov (DK)

(73) Assignee: LM Glasfiber A/S, Kolding (DK)

( * ) Notice: Subject to any disclaimer, the term of this patent is extended or adjusted under 35 U.S.C. 154(b) by 518 days.

(21) Appl. No.: 12/733,362

(22) PCT Filed: Aug. 29, 2008

(86) PCT No.: PCT/DK2008/000312
§ 371 (c)(1),
(2), (4) Date: Feb. 25, 2010

(87) PCT Pub. No.: WO2009/026928
PCT Pub. Date: Mar. 5, 2009

(65) Prior Publication Data
US 2010/0209257 A1 Aug. 19, 2010

(30) Foreign Application Priority Data

Aug. 31, 2007 (EP) .................................... 07388064

(51) Int. Cl.
B63H 1/28 (2006.01)
B64C 11/16 (2006.01)
F01D 5/14 (2006.01)

(52) U.S. Cl.
USPC ....................................... 416/231 R; 416/235

(58) Field of Classification Search
USPC .............. 244/198, 199.1, 199.2, 200, 200.1; 296/180.3; 415/83; 416/223 R, 231 B, 416/231 R, 228, 235, 236 R, 237, 241 R
See application file for complete search history.

(56) References Cited

U.S. PATENT DOCUMENTS 2,800,291 A 7/1957 Stephens
4,382,569 A 5/1983 Boppe et al.
(Continued)

FOREIGN PATENT DOCUMENTS

DE 197 38 278 A1 3/1999
EP 1213442 A1 * 6/2002
(Continued)

*Primary Examiner* — Edward Look
*Assistant Examiner* — Christopher J Hargitt
(74) *Attorney, Agent, or Firm* — Nath, Goldberg & Meyer; Jerald L. Meyer; Sanjana Mangalagiri

(57) ABSTRACT

A wind turbine blade having a longitudinal direction with a root end and a tip end as well as a chord extending in a transverse direction between a leading edge and a trailing edge is described. The blade comprises a flow control surface with a suction side and a pressure side. A number of boundary layer control means is formed in the flow control surface. The boundary layer control means include a channel submerged in the flow control surface with a first end facing towards the leading edge and a second end facing towards the trailing edge of the blade. The channel comprises: a bottom surface extending from the first end to the second end, a first sidewall extending between the flow control surface and the bottom surface and extending between the first end and the second end, the first sidewall forming a first sidewall edge between the first side wall and the flow control surface, and a second sidewall extending between the flow control surface and the bottom surface and extending between the first end and the second end, the second sidewall forming a second sidewall edge between the second side wall and the flow control surface. The channel at the first end comprises a first flow accelerating channel zone adapted for accelerating a flow, and at the second end comprises a second channel zone, where the first sidewall and the second sidewall are diverging towards the trailing edge of the blade.

21 Claims, 6 Drawing Sheets

(56) References Cited

U.S. PATENT DOCUMENTS

| | | | |
|---|---|---|---|
| 4,455,045 A | | 6/1984 | Wheeler |
| 4,696,442 A | | 9/1987 | Mazzitelli |
| 4,699,340 A | | 10/1987 | Rethorst |
| 5,088,665 A | * | 2/1992 | Vijgen et al. ............... 244/200 |
| 5,542,630 A | * | 8/1996 | Savill ......................... 244/200 |
| 5,598,990 A | * | 2/1997 | Farokhi et al. ............ 244/200.1 |
| 6,910,867 B2 | * | 6/2005 | Corten ....................... 416/223 R |
| 7,059,833 B2 | * | 6/2006 | Stiesdal et al. ................ 416/41 |
| 7,086,834 B2 | * | 8/2006 | LeMieux .......................... 416/1 |
| 2002/0179777 A1 | | 12/2002 | Al-Garni et al. |

FOREIGN PATENT DOCUMENTS

| | | |
|---|---|---|
| FR | 2 619 069 A1 | 2/1989 |
| GB | 2 173 861 A | 10/1986 |
| WO | WO 83/01421 A1 | 4/1983 |
| WO | WO 88/10210 A1 | 12/1988 |
| WO | WO 00/15961 A1 * | 3/2000 |
| WO | WO 01/16482 A1 | 3/2001 |
| WO | WO 02/064422 A1 | 8/2002 |
| WO | WO 2007/035758 A1 | 3/2007 |

* cited by examiner

WIND TURBINE BLADE WITH SUBMERGED BOUNDARY LAYER CONTROL MEANS

This is a National Phase Application filed under 35 USC 371 of International Application No. PCT/DK2008/000312, filed on Aug. 29, 2008, an application claiming foreign priority benefits under 35 USC 119 of European Application No. 07388064.3, filed on Aug. 31, 2007, the content of each of which is hereby incorporated by reference in its entirety.

TECHNICAL FIELD

The present invention relates to a wind turbine blade having a longitudinal direction with a root end and a tip end as well as a chord extending in a transverse direction between a leading edge and a trailing edge, the blade comprising a flow control surface with a suction side and a pressure side.

BACKGROUND

There are many situations, where it is desirable to provide a method of delaying or preventing flow separation between a flowing medium and a flow control surface in regions where the boundary layer of the flow medium due to the profile of the flow control surface is subjected to pressure gradients, which are sufficient to cause flow separation.

When a viscous fluid passes over a wind turbine blade towards the trailing edge, the fluid flows from a region with low static pressure to a region with high static pressure, in the process being subjected to an adverse pressure gradient. This in turn results in forces, which tend to retard the boundary layer, which can be strong enough to arrest or reverse the flow, which can cause the fluid to separate and behave in a non-predictable manner. This causes an increase in drag due to the cross-sectional area of separated flow in the wake of the flow control medium, which in turn reduces the lift of the wind turbine blade and even may cause the blade to stall.

It is well-known to delay or prevent flow separation by mixing free flow with the boundary layer by use of vortex generators protruding from the flow control surface, i.e. from the surface of the wind turbine blade. There is a large number of different vortex generator types, such as of the vane type, see for instance WO 01/16482, or vortex generators formed as delta shaped protrusions as shown in WO 00/15961. However, all of these vortex generators are encumbered with a drawback of relatively high drag. Furthermore, these vortex generators, which are usually mounted on the surface of the wind turbine blade after production of the blade, have a tendency to break off during transport, which may seriously impair the functionality of the blade.

U.S. Pat. No. 4,455,045 describes an alternative means to maintain a flow of a flowing medium attached to the exterior of a flow control member, where an essentially triangular shaped channel is submerged in the surface of the flow control member. The triangular shaped channel has an apex portion facing the flow of the flowing medium, and the channel emerges at the surface of this apex portion.

DISCLOSURE OF THE INVENTION

It is an object of the invention to provide a new blade for a rotor of a wind turbine, which overcomes or ameliorates at least one of the disadvantages of the prior art or which provides a useful alternative.

According to a first aspect of the invention, the object is achieved by a number of boundary layer control means being formed in the flow control surface, wherein the boundary layer control means include a channel submerged in the flow control surface with a first end facing towards the leading edge and a second end facing towards the trailing edge of the blade, the channel comprising: a bottom surface extending from the first end to the second end, a first sidewall extending between the flow control surface and the bottom surface and extending between the first end and the second end, the first sidewall forming a first sidewall edge between the first side wall and the flow control surface, and a second sidewall extending between the flow control surface and the bottom surface and extending between the first end and the second end, the second sidewall forming a second sidewall edge between the second side wall and the flow control surface, and wherein the channel at the first end comprises a first flow accelerating channel zone adapted for accelerating a flow, and at the second end comprises a second channel zone, where the first sidewall and the second sidewall are diverging towards the trailing edge of the blade.

When a free flow passes over the wind turbine blade during normal use of the blade, i.e. during rotation in a rotor of a horizontal axis wind turbine blade, in a substantially transverse direction from the leading edge to the trailing edge of the blade, the flow is first accelerated in the first flow accelerating channel zone. In the second channel zone, the flow separates from the first sidewall and/or the second sidewall due to the diverging angle between these two sidewalls, which causes strong vortices to be generated. These vortices pull the boundary layer towards the flow control surface and thus prevent the boundary layer from separating from the exterior of the wind turbine blade. The first flow accelerating channel zone ensures that strong vortices are generated as the vorticity is dependent on the velocity of the flow—the higher the flow velocity the stronger the vorticity. This provides for a wind turbine blade, where detachment of the flow can be delayed towards the trailing edge of the blade or be prevented entirely. Thus, the overall lift and efficiency of the wind turbine blade can be increased.

Preferably, the number of boundary layer control means is arranged on the suction side of the blade. The boundary layer control means, i.e. the vortex generating channels, are typically arranged in an array in the spanwise or longitudinal direction of the blade. The boundary layer control means can also be cascaded in the chordwise or trans-verse direction, i.e. in the direction of the chord.

According to an advantageous embodiment, the first sidewall and the second sidewall are non-divergent in the first flow accelerating channel zone, i.e. the first sidewall and the second sidewall can be parallel or converging.

According to an embodiment of the boundary layer control means, the channel in first flow accelerating zone has a cross sectional area, which is decreasing in the direction of the flow. This provides a simple solution for accelerating the flow before reaching the part, where the channel sidewalls are diverging and where the vortices are generated.

In another embodiment according to the invention, the first sidewall and the second sidewall in the second channel zone are diverging with an angle of more than 10 degrees, or with an angle of more than 25 degrees, or with an angle of more than 35 degrees, or with an angle of more than 45 degrees. Thus, the sidewalls form such angles in at least a part of the second channel zone, preferably at the part nearest the second end.

In yet another embodiment according to the invention, the first sidewall has a first height and the second sidewall has a second height, wherein the first height and the second height in the first flow accelerating channel zone are decreasing towards the trailing edge of the blade, i.e. in the direction of the flow. This provides for a first solution of decreasing the cross-sectional area of the first flow accelerating channel zone in the direction of the flow in order to provide an efficient acceleration of the flow. Additionally or alternatively, the first sidewall and the second sidewall can be converging in the first flow accelerating zone towards the trailing edge of the blade or equivalently in the direction of the flow.

According to one embodiment, the first sidewall and/or the second sidewall has a sharp edge between the first channel zone and the second channel zone. In other words, the transverse distance between the first sidewall and the second sidewall may vary discontinuously in the flow direction. This provides for an embodiment, where the flow separates from the first sidewall and/or the second sidewall immediately after the end of the second channel zone, which faces the flow. Alternatively, the channel can comprise an intermediate zone between the first flow accelerating channel zone and the second channel zone, where the first sidewall and the second sidewall gradually change from being converging to being diverging towards the trailing edge of the blade.

According to one embodiment of the wind turbine blade, the first sidewall or the second sidewall are substantially oriented in the transverse direction of the blade, i.e. being aligned with the flow of the flowing medium. That is, the channel has one sidewall, which is parallel to the flow direction, and the other sidewall forming the converging and the diverging parts of the channels. This embodiment generates only a single set of vortices.

According to another embodiment, the first sidewall and the second sidewall are oriented with an angle to the transverse direction of the blade, i.e. being out of alignment with the flow of the flowing medium. Accordingly both sidewalls are non-parallel to the flow direction. This embodiment can generate two sets of vortices. The diversion angle of the sidewalls in the configuration generating only a single set of vortices may be smaller (approximately half of) than the diversion angle of this configuration.

According to an alternative embodiment, the first flow accelerating channel zone comprises a number of ventilation holes for accelerating the flow. If the flow control member is constructed as a shell member having an interior and an exterior surface, such as a wind turbine blade, the ventilation holes can be adapted to communicate between the interior and the exterior of the flow control member. This provides for another simple solution of accelerating the flow in the first flow accelerating zone.

In one embodiment according to the invention, the first sidewall edge and/or the second sidewall edge are relatively sharp edges, i.e. the sidewalls and the flow control surface form angles of about 90 degrees. However, the edges need not be about 90 degrees for the vortex generating channels to function intentionally. Thus, the first sidewall and the second sidewall may also cross-sectionally diverge, so that the first sidewall edge and the second sidewall edge form angles of more than 90 degrees.

In another embodiment according to the invention, the first sidewall edge and/or the second sidewall edge extend beyond the flow control surface. This can for instance be implemented by forming a lip above the channel. Thereby, the channel does not have a sharp edge, thereby making it easier to mould the object with the flow control surface.

The bottom surface can also be either convex or concave in the flow direction. The bottom surface can be rounded or substantially flat, when seen in the cross-section of the channel.

The channel can also be provided with an inlet arranged before the first flow accelerating channel zone and/or be provided with an outlet arranged after the second channel zone. Thus, the channel can emerge at the flow control surface at the end of the inlet or at the end of the first flow accelerating channel zone, as well as emerge at the end of the second channel zone or at the end of the outlet. The first sidewall and the sec- and sidewall can be substantially parallel to the flow direction within the inlet and the outlet of the channel. The channel can also have a small discontinuity, i.e. the height of the channel or sidewalls may decrease stepwise.

During use, the wind turbine blade is mounted to a rotor hub. The blade is typically divided into a root region with a substantially circular profile closest to the hub, an airfoil region with a lift generating profile furthest away from the hub, and a transition region between the root region and the airfoil region, the profile of the transition region gradually changing in the radial direction from the circular profile of the root region to the lift generating profile of the airfoil region.

The boundary layer control means are positioned mainly on the profiled part of the blade, i.e. the airfoil region and optionally the transition region of the blade.

The chordwise position of the boundary layer control means can be between 10% and 80% of the chord as seen from the leading edge. Alternatively, they are positioned within a region extending between 20% and 70% of the chord as seen from the leading edge. In general the boundary layer control means are utilised to delay separation, where a forward position, i.e. close to the leading edge, is used to delay stall, and a backward position, i.e. further away from the leading edge, is used to increase efficiency.

According to an advantageous embodiment of the wind turbine blade, the height of the channels is between 0.1% and 5% of the chord length, or alternatively between 0.2% and 3.5%, or alternatively between 0.5% and 2%. These heights effectively produce vortices of the desired size. The mentioned channel height is preferably located at the position, where the vortices are generated, i.e. immediately after the start of the diverging second channel zone. In general, the vortices preferably correspond to the height of the channels and/or the boundary layer.

According to another advantageous embodiment, the boundary layer control means are adapted for generating vortices having a height substantially the same as height of the first sidewall and/or the second sidewall.

According to a preferred embodiment of the blade according to the invention, the wind turbine blade is constructed as a shell member of fibre-reinforced polymer. The channels can be formed in the surface of the wind turbine blade during the moulding process, either by forming protrusions in a negative mould, or by moulding strips of a dissolvable material in the surface of the wind turbine blade, which after moulding is dissolved in order to form the vortex generating channels. The channels can also be formed in the surface of the blade after moulding by for instance milling.

According to a second aspect, the invention also provides a wind turbine rotor comprising a number, preferably two or three, of the previously mentioned wind turbine blades. According to a third aspect, a wind turbine comprising such a wind turbine rotor or a number of such wind turbine blades is provided.

The various embodiments of the boundary layer control means of course also may be used to other flow control members, i.e. a flow control member having a flow control surface, wherein the flow control member is provided with boundary layer control means for maintaining a flow of a flowing medium attached to the exterior of the flow control member, the flow having a flow direction, wherein the boundary layer control means include: a channel submerged in the flow control surface, the channel having: a first end facing the flow of the flowing medium, a second end positioned downstream in the flow of the flowing medium from the first end, a bottom surface extending from the first end to the second end, a first sidewall extending between the flow control surface and the bottom surface and extending between the first end and the second end, the first sidewall forming a first sidewall edge between the first side wall and the flow control surface, and a second sidewall extending between the flow control surface and the bottom surface and extending between the first end and the second end, the second sidewall forming a second sidewall edge between the second side wall and the flow control surface, wherein the channel at the first end comprises a first flow accelerating channel zone, where the flow is accelerated, and at the second end comprises a second channel zone, where the first sidewall and the second sidewall are diverging in the flow direction.

BRIEF DESCRIPTION OF THE DRAWINGS

The invention is explained in detail below with reference to the drawings, in which.

DETAILED DESCRIPTION OF THE INVENTION

Figure 1:
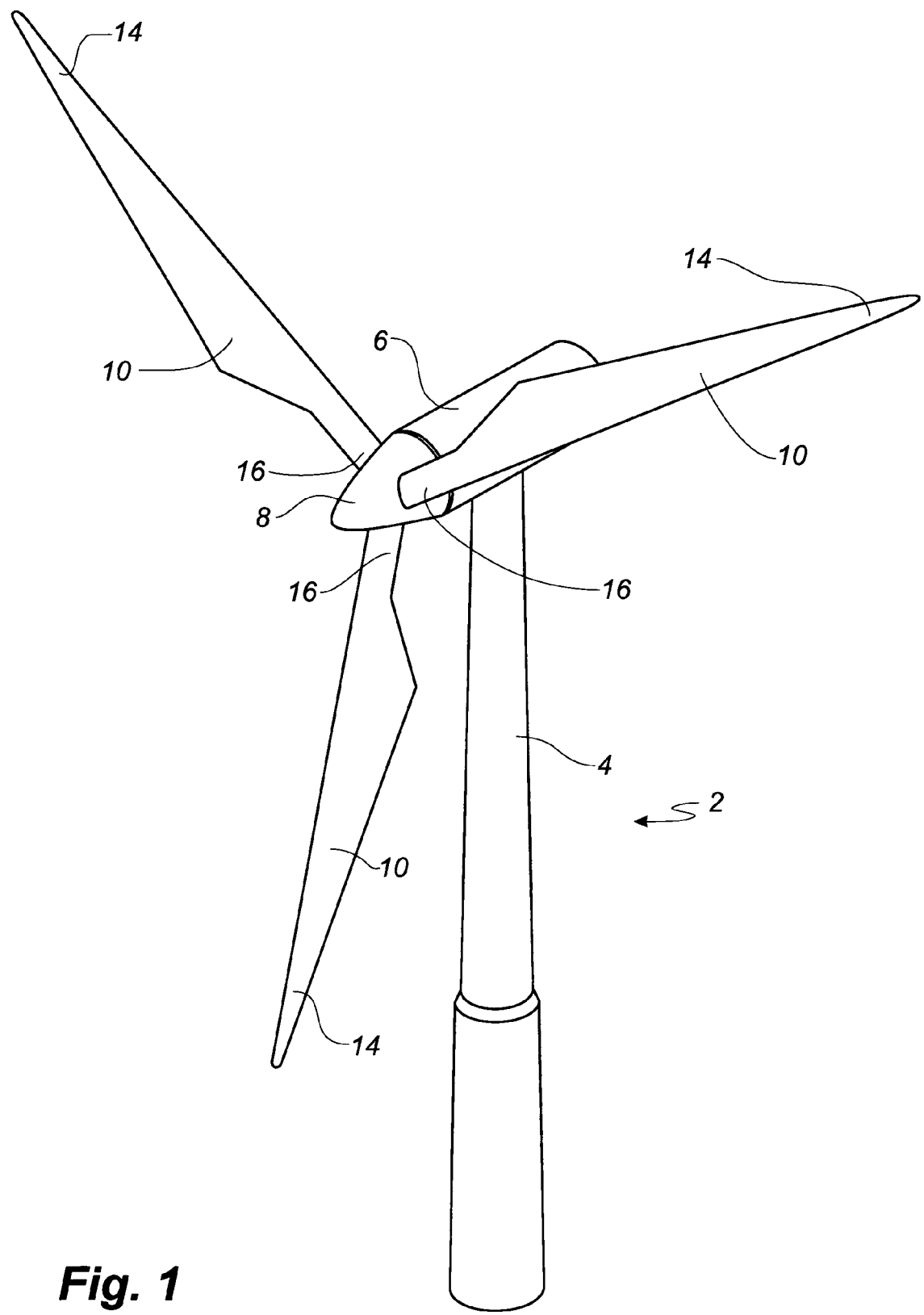
FIG. 1 shows a wind turbine, FIG. 2 a schematic view of a wind turbine blade according to the invention, FIG. 3 a first embodiment of a boundary layer control means, FIG. 4 a second embodiment of a boundary layer control means, FIG. 5 a third embodiment of a boundary layer control means, FIG. 6 a cross-sectional view of a channel being part of the boundary layer control means, FIG. 7 a second cross-sectional view of a channel being part of boundary layer control means, FIG. 8 a fourth embodiment of a boundary layer control means, FIG. 9 a fifth embodiment of a boundary layer control means, and FIG. 10 a sixth embodiment of a boundary layer control means.

FIG. 1 illustrates a conventional modern wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

Figure 2:
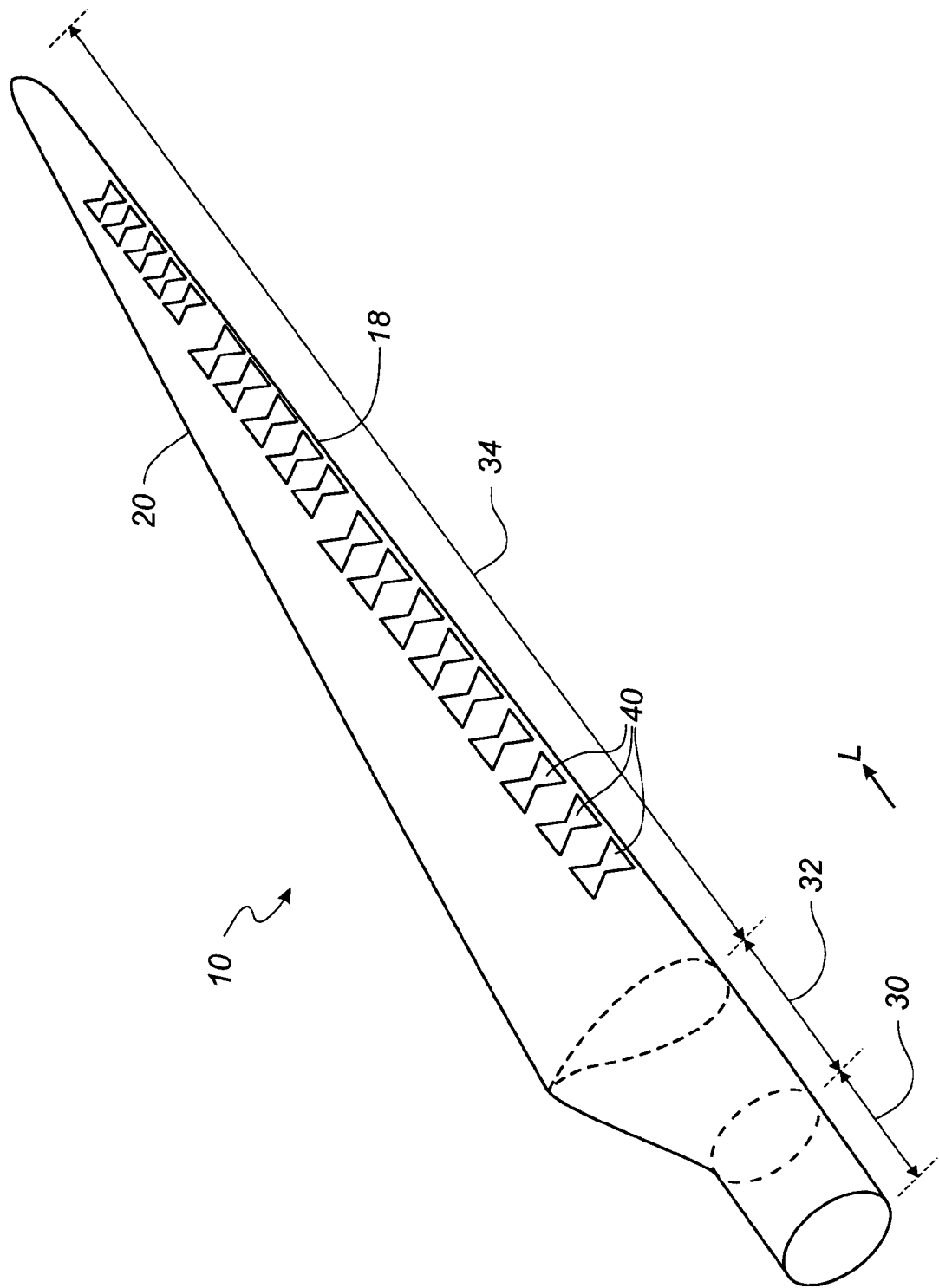

FIG. 2 shows a schematic view of an embodiment of a wind turbine according to the invention. The wind turbine blade 10 comprises a number of boundary layer control means 40 according to the invention, the boundary layer control means being formed as submerged channels in the surface of a suction side of the wind turbine blade 10.

The wind turbine blade 10 has the shape of a conventional wind turbine blade and comprises a root region 30 closest to the hub, a profiled or an airfoil region 34 furthest away from the hub and a transition region 32 between the root region 30 and the region area 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 has a substantially circular or elliptical cross-section, which reduces loads from wind gusts and makes it easier and safer to mount the blade 10 to the hub. The diameter of the root region 30 is typically constant along the entire root area 30. The transition region 32 has a shape gradually changing from the circular shape of the root region 30 to the airfoil profile of the airfoil region 34, optionally with an intermediate elliptical shape. The width of the transition region 32 typically increases substantially linearly with increasing distance L from the hub.

The airfoil region 34 has an airfoil profile with a chord extending between the leading edge 18 and the trailing edge 20 of the blade 10. The width of the chord decreases with increasing distance L from the hub. It should be noted that the chords of different sections of the blade do not necessarily lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The boundary layer control means 40 are arranged in arrays in the spanwise or longitudinal direction L of the blade. The sizes of the individual channels are grossly exaggerated in the figure and will normally be much smaller compared to the wind turbine blade. Thus, the wind turbine blade can comprise a much higher number of the boundary layer control means 40 in the longitudinal direction L of the wind turbine blade 10.

The boundary layer control means 40 are utilised to generate vortices of turbulent flow within the channel of the boundary layer control means 40, the vortices pulling a boundary layer of a flowing medium flowing across the surface of the wind turbine blade 10 from the leading edge 18 to the trailing edge 20 towards the surface of the wind turbine blade, thus preventing the boundary layer from separating from the exterior of the wind turbine blade 10. The boundary layer control means 40 may be cascaded in the chord-wise direction (or equivalently the transverse direction) of the blade 10 in order to continuously generate vortices in the chord-wise direction L of the blade 10.

The boundary layer control means 40 can be of any of the embodiments shown in FIGS. 3-10 or combinations thereof.

Figure 3:
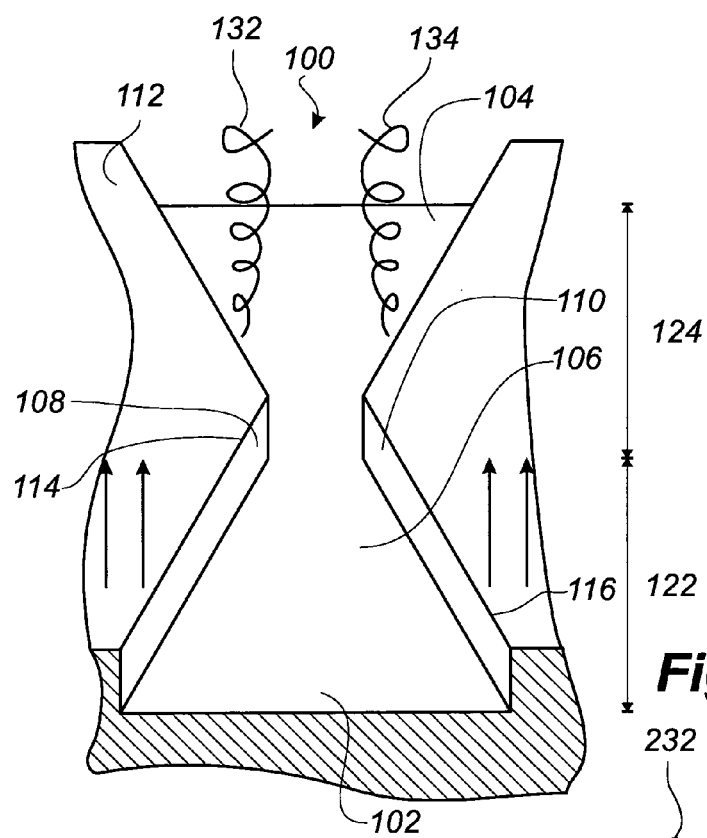

FIG. 3 shows a schematic view of a first embodiment of a boundary layer control means 100 for maintaining flow of a flowing medium attached to the exterior of a flow control member, such as a wind turbine blade, having a flow control surface 112. The boundary layer control means 100 comprises a channel, which is submerged in the flow control surface 112. The channel extends in the direction of a free flow having a flow direction, which is depicted with arrows in the figure. The channel comprises a first end 102 facing the free flow and a second end 104 positioned downstream in the flow of the flowing medium from the first end 102.

The channel comprises a bottom surface 106 extending from the first end 102 to the second end 104. The channel further comprises a first sidewall 108 extending between the flow control surface 112 and the bottom surface 106, as well as a second sidewall 110 extending between the flow control surface 112 and the bottom surface 106. The first sidewall 108 forms a first sidewall edge 114 with the flow control surface 112, and the second sidewall 110 forms a second sidewall edge 116 with the flow control surface 112.

The channel comprises a first flow accelerating channel zone 122 at the first end 102 of the channel, and a second channel zone 124 at the second end 104 of the channel. In the first flow accelerating channel zone 122, the cross-sectional area of the channel is decreasing in the flow direction, which provides for a simple solution for accelerating the flow passing through the channel. In the depicted embodiment, the cross-sectional area is decreased in the flow direction by the first sidewall 108 and the second sidewall 110 being converging in the flow direction. However, this can also be provided by the first sidewall 108 and second sidewall being parallel, for instance parallel to the free flow, and the distance between the flow control surface 112 and the bottom surface 106 decreasing in the flow direction; that is, the height of the channel decreasing in the flow direction.

In the second channel zone 124, the first sidewall 108 and the second sidewall 110 are diverging in the flow direction. Thus, the flow which has been accelerated in the first flow accelerating channel zone 122 detaches from the first sidewall 108 and the second sidewall 110. Therefore, a local underpressure is generated at the first sidewall 108 and the second sidewall 110, which in turn generates a first set of vortices of turbulent flow 132 and a second set of vortices of turbulent flow 134, respectively. These sets of vortices 132, 134 pull the boundary layer of a the flowing medium towards the flow control surface 112, which ensures that the boundary layer separates further downstream of the flow or is prevented entirely. If the flow control member is a wind turbine blade, this means that the overall lift of the blade can be improved.

In the embodiment depicted in FIG. 3, the first flow accelerating channel zone 122 and the second channel zone 124 are separated by a sharp edge, i.e. the width of the channel is discontinuous in the flow direction.

The height of the vortices should generally correspond to the height of the channel, i.e. the distance between the bottom surface 106 and the flow control surface 112, in order to efficiently keep the flow attached to the exterior of the flow control member.

Figure 4:
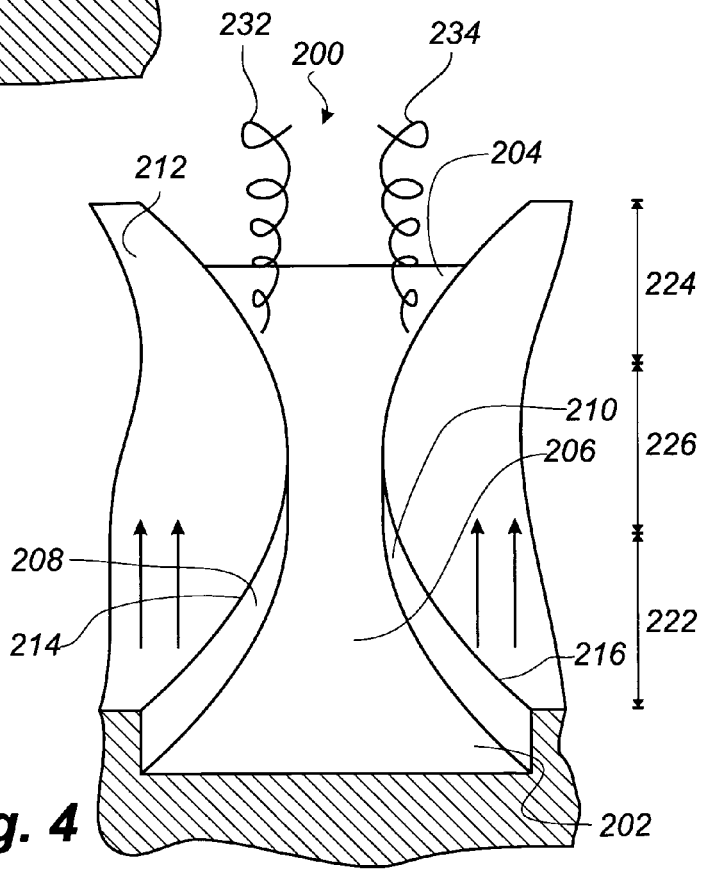

FIG. 4 shows a second embodiment of a boundary layer control means 200. In the figure like numerals refer to like parts of the first embodiment. Therefore, only the differences between the first embodiment and the second embodiment are described. The second embodiment differs from the first embodiment in that it comprises an intermediate zone 226 between the first flow accelerating channel zone 222 and the second channel zone 226 instead of having a sharp edge separating the first flow accelerating channel zone 222 and the second channel zone 226.

Figure 5:
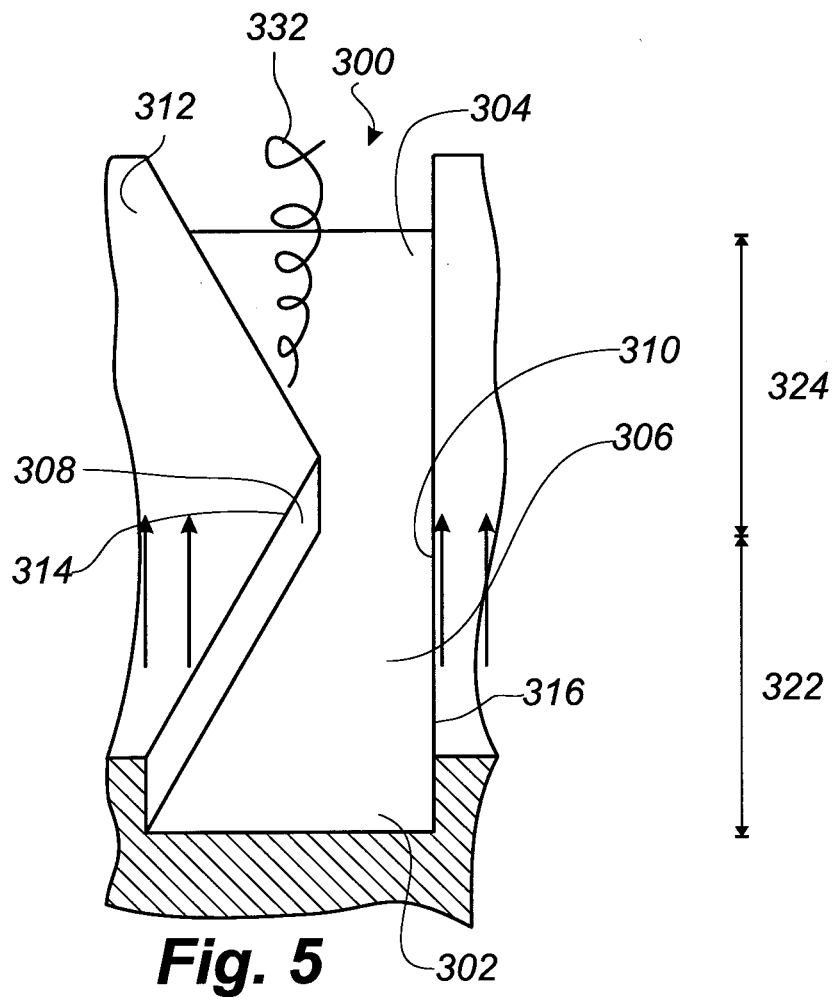

FIG. 5 shows a third embodiment of a boundary layer control means 300, wherein like numerals refer to like parts of the first embodiment. Therefore, only differences between the first embodiment and the third embodiment are described. This embodiment differs from the first embodiment by the second sidewall 310 being substantially parallel to the flow direction (shown with arrows) of the free flow, both within the first flow accelerating channel zone 322 and the second channel zone 324. Therefore, the flow only separates from the first sidewall 308 in the second flow channel zone, thus only generating one set of vortices 332.

Figure 6:
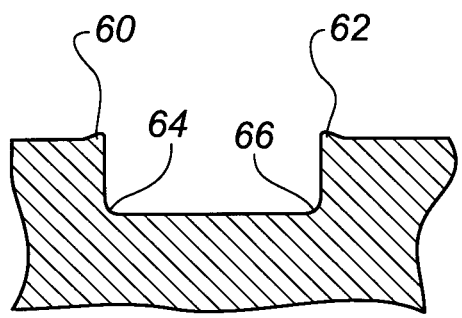
Figure 7:
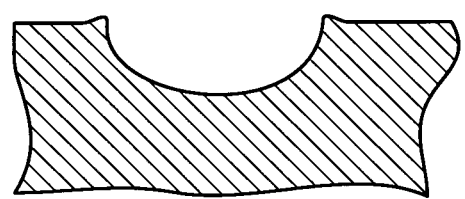

In the embodiments shown in FIGS. 3-5 the first sidewall edge and the second sidewall edge are depicted as having an angle of about 90 degrees. However, the first sidewall edge and the second sidewall edge can also protrude beyond the flow control surface and form lips 60, 62 above the channel as shown in FIG. 6, which depicts a cross-section of a channel according to the invention. Furthermore, a first bottom edge 64 and a second bottom edge 66 formed between the first sidewall and the bottom surface and the second sidewall and the bottom surface, respectively, can be rounded. Thus, the channel does not have any sharp edge, thereby making it easier to mould the object with the flow control surface. The bottom surface of the channel can also be even more rounded as depicted in FIG. 7.

Figure 8:
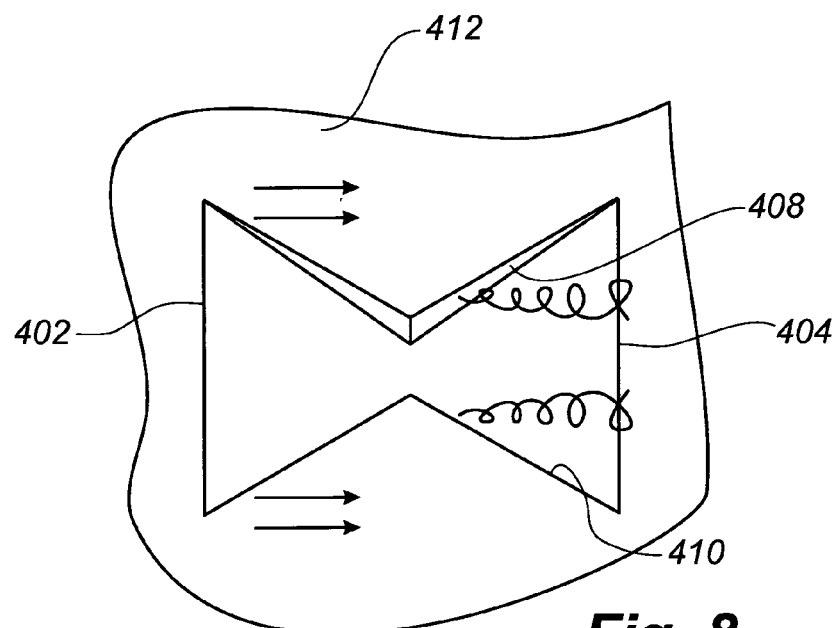

FIG. 8 shows a fourth embodiment of a boundary layer control means for maintaining a flow attached to the exterior of a flow control member and is a variation of the embodiment shown in FIG. 3. The boundary layer control means comprises a channel submerged in a flow control surface 412 and has a first end 402 and a second end 404. The sides of the channel are defined by a first sidewall 408 and a second sidewall 410, which have a first height and a second height, respectively. The first sidewall 408 and the second sidewall 410 have a maximum height between the first flow accelerating zone and the second channel zone. The first height and the second height are decreasing from this position of maximum height towards the first end 402 and the second end 404, so that the channel emerges at the flow control surface 412 at the first end 402 and the second end 404.

Figure 9:
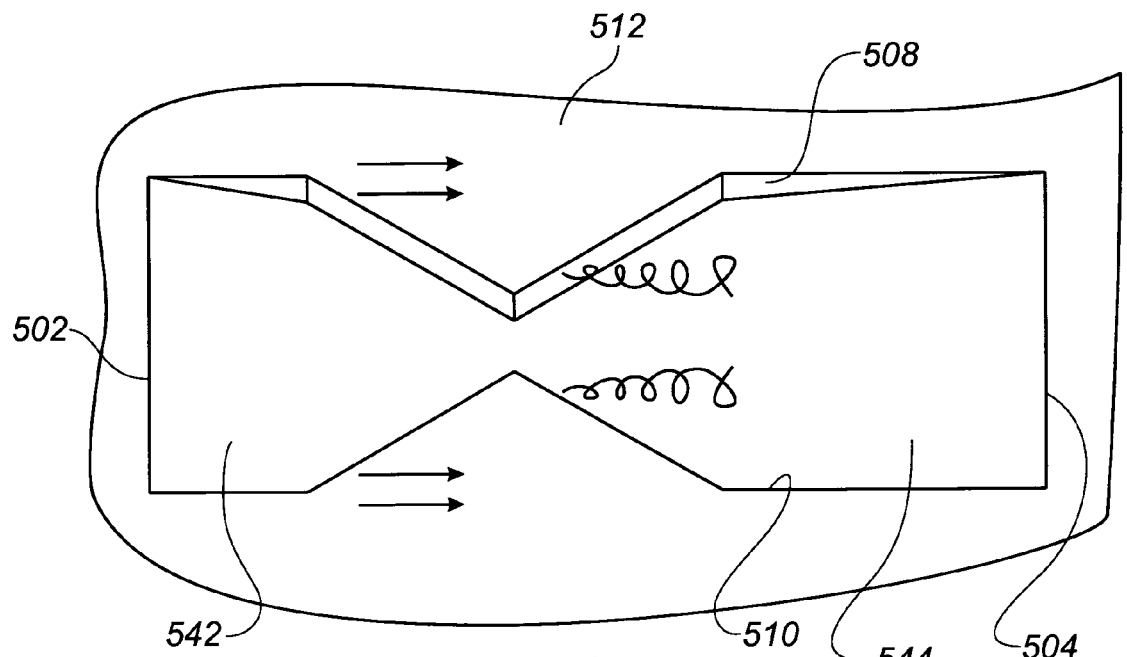

FIG. 9 shows a fifth embodiment of a boundary layer control means, wherein like numerals refer to like parts of the fourth embodiment. This embodiment differs from the fourth embodiment in that the first height and the second height are substantially constant in the first flow accelerating channel zone and the second channel zone. Instead the channel is provided with an inlet region 542, where the first sidewall 508 and the second sidewall 510 are substantially parallel to the flow direction of the free flow, which is illustrated with arrows. The first height and the second height are in the inlet region decreasing towards the first end 502 so that the channel emerges at the flow control surface 512 at the first end 502. Furthermore, the channel is provided with an outlet region 542, where the first sidewall 508 and the second sidewall 510 are substantially parallel to the flow direction of the free flow. The first height and the second height are in the outlet region 544 decreasing towards the second end 504 so that the channel emerges at the flow control surface 512 at the second end 504.

Figure 10:
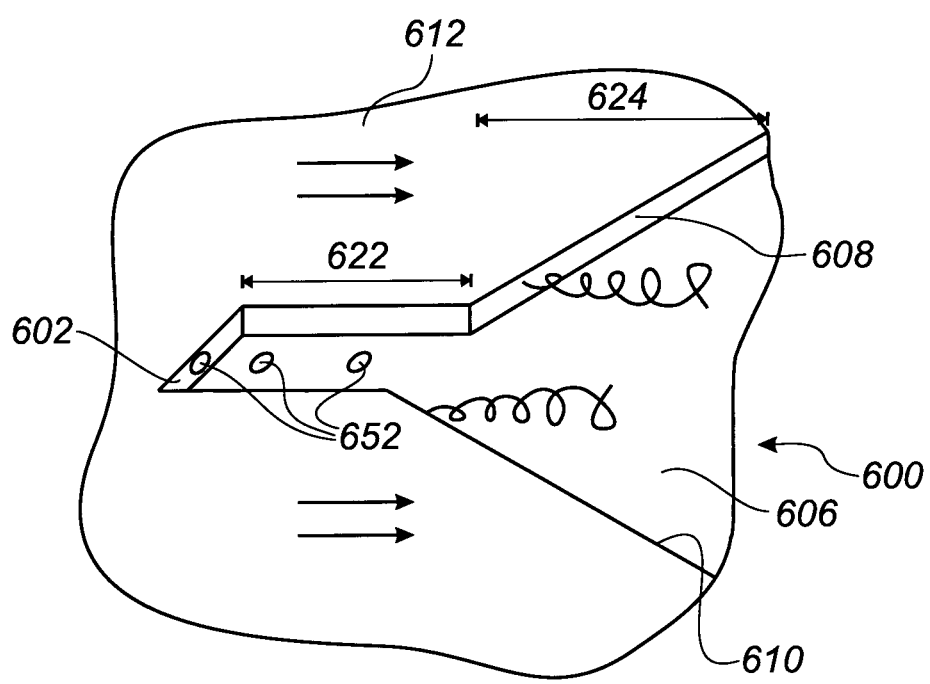

FIG. 10 shows a sixth embodiment of a boundary layer control means, wherein like numerals refer to like parts of the first embodiment. Therefore, only differences between the first embodiment and the sixth embodiment are described. This embodiment differs from the first embodiment in that the first sidewall 508 and the second sidewall 510 are substantially parallel to the flow direction of the free flow in the first flow accelerating channel zone 622. The acceleration of the flow is instead provided by a number of ventilation holes 652, which can ventilate air, for instance compressed air, from an interior of the flow control member and into the channel in the first flow accelerating channel zone 622. The ventilation holes 652 can be arranged in the bottom surface 606 or in an end facet at the first end 602 of the channel.

The invention has been described with reference to a preferred embodiment. However, the scope of the invention is not limited to the illustrated embodiment, and alterations and modifications can be carried out without deviating from the scope of the invention. For instance can the second channel zones of adjacent boundary layer control means merge into a common channel zone.

LIST OF REFERENCE NUMERALS

In the numerals, x refers to a particular embodiment. Thus, for instance 402 refers to the first end of the fourth embodiment.
2 wind turbine
4 tower
6 nacelle 8 hub
10 blade
14 blade tip
16 blade root
18 leading edge
20 trailing edge
30 root region
32 transition region
34 airfoil region
40 boundary layer control means
60, 62 lips
64 first bottom edge
66 second bottom edge
x00 boundary layer control means
x02 first end
x04 second end
x06 bottom surface
x08 first sidewall
x10 second sidewall
x12 flow control surface
x14 first sidewall edge
x16 second sidewall edge
x22 first flow accelerating channel zone
x24 second channel zone
x26 intermediate channel zone
x32 first set of vortices
x34 second set of vortices
x42 inlet
x44 outlet
x52 ventilation holes

The invention claimed is:

1. Wind turbine blade (10) having a longitudinal direction with a root end (16) and a tip end (14) as well as a chord extending in a transverse direction between a leading edge (18) and a trailing edge (20), the blade (10) comprising a flow control surface with a suction side and a pressure side, wherein a number of boundary layer control means (40) is formed in the flow control surface, wherein the boundary layer control means (40) include a channel submerged in the flow control surface (112; 212; 312; 412; 512; 612) with a first end (102; 202; 302; 402; 502; 602) facing towards the leading edge (18) and a second end (104; 204; 304; 404; 504; 604) facing towards the trailing edge (20) of the blade (10), the channel comprising:
a bottom surface (106; 206; 306; 606) extending from the first end (102; 202; 302; 402; 502; 602) to the second end (104; 204; 304; 404; 504; 604),
a first sidewall (108; 208; 308; 408; 508; 608) extending between the flow control surface (112; 212; 312; 412; 512; 612) and the bottom surface (106; 206; 306; 606) and extending between the first end (102; 202; 302; 402; 502; 602) and the second end (104; 204; 304; 404; 504; 604), the first sidewall (108; 208; 308; 408; 508; 608) forming a first sidewall edge (114; 214; 314) between the first side wall (108; 208; 308; 408; 508; 608) and the flow control surface (112; 212; 312; 412; 512; 612), and
a second sidewall (110; 210; 310; 410; 510; 610) extending between the flow control surface (112; 212; 312; 412; 512; 612) and the bottom surface (106; 206; 306; 606) and extending between the first end (102; 202; 302; 402; 502; 602) and the second end (104; 204; 304; 404; 504; 604), the second sidewall (110; 210; 310; 410; 510; 610) forming a second sidewall edge (116; 216; 316) between the second side wall (110; 210; 310; 410; 510; 610) and the flow control surface (112; 212; 312; 412; 512; 612), characterized in that
the channel at the first end (102; 202; 302; 402; 502; 602) comprises a first flow accelerating channel zone (122; 222; 322; 622) adapted for accelerating a flow, wherein the first sidewall and the second sidewall of the first flow accelerating channel zone are non-divergent, and the channel at the second end (104; 204; 304; 404; 504; 604) comprises a second channel zone (124; 224; 324; 624), where the first sidewall (108; 208; 308; 408; 508; 608) and the second sidewall (110; 210; 310; 410; 510; 610) in the second channel zone are diverging towards the trailing edge (20) of the blade (10) and wherein a vortex is generated and propagated within the second channel zone.

2. A wind turbine blade according to claim 1, wherein when a free flow passes over the wind turbine blade in a substantially transverse direction from the leading edge to the trailing edge of the blade, the flow is first accelerated in the first flow accelerating channel zone, and wherein the flow in the second channel zone separates from the first sidewall and/or the second sidewall.

3. A wind turbine blade according to claim 1, wherein the boundary layer control means (40) is arranged on the suction side of the blade.

4. A wind turbine blade according to claim 1, wherein the first sidewall (108; 208; 308; 408; 508; 608) and the second sidewall (110; 210; 310; 410; 510; 610) in the first flow accelerating channel zone (122; 222; 322; 622) are non-divergent in a direction from the first end (102; 202; 302; 402; 502; 602) to the second end (104; 204; 304; 404; 504; 604).

5. A wind turbine blade according to claim 1, wherein the first flow accelerating zone (122; 222; 322; 622) has a cross sectional area, which is decreasing towards the trailing edge of the blade (10).

6. A wind turbine blade according to claim 1, wherein the first sidewall (108; 208; 308; 408; 508; 608) and the second sidewall (110; 210; 310; 410; 510; 610) in the second channel zone (124; 224; 324; 624) are diverging with an angle of more than 10 degrees, or alternatively with an angle of more than 25 degrees, or alternatively with an angle of more than 45 degrees.

7. A wind turbine blade according to claim 1, wherein the first sidewall (108; 208; 308; 408; 508; 608) has a first height and the second sidewall (110; 210; 310; 410; 510; 610) has a second height, and wherein the first height and the second height in the first flow accelerating channel zone (122; 222; 322; 622) are decreasing towards the trailing edge (20) of the blade (10).

8. A wind turbine blade according to claim 1, wherein the first sidewall (108; 208; 308; 408; 508; 608) and the second sidewall (110; 210; 310; 410; 510; 610) has a sharp edge between the first flow accelerating channel zone (122; 222; 322; 622) and the second channel zone (124; 224; 324; 624).

9. A wind turbine blade according to claim 1, wherein the channel comprises an intermediate zone (226) between the first channel zone (122; 222; 322; 622) and the second channel zone (124; 224; 324; 624), where the first sidewall (108; 208; 308; 408; 508; 608) and the second sidewall (110; 210; 310; 410; 510; 610) gradually change from being converging to being diverging towards the trailing edge (20) of the blade (10).

10. A wind turbine blade according to claim 1, wherein the first sidewall (108; 208; 308; 408; 508; 608) or the second sidewall (110; 210; 310; 410; 510; 610) are substantially oriented in the transverse direction of the blade (10).

11. A wind turbine blade according to claim 1, wherein the first sidewall (108; 208; 308; 408; 508; 608) and the second sidewall (110; 210; 310; 410; 510; 610) are out of oriented with an angle to the transverse direction of the blade (10).

12. A wind turbine blade according to claim 1, wherein the first flow accelerating channel zone (122; 222; 322; 622) comprises a number of ventilation holes (652) for accelerating the flow.

13. A wind turbine blade according to claim 1, wherein the height of the channels is between 0.1% and 5% of a length of the chord at the longitudinal position of the channel, or alternatively between 0.2% and 3.5%, or alternatively between 0.5% and 2%.

14. A wind turbine blade according to claim 1, wherein the blade is divided into: a root region (30) with a substantially circular or elliptical profile closest to the root end, an airfoil region (34) with a lift generating profile furthest away from the root end and closest to the tip end, and a transition region (32) between the root region (30) and the airfoil region (34), the profile of the transition region (32) gradually changing in the radial direction from the circular or elliptical profile of the root region to the lift generating profile of the airfoil region.

15. A wind turbine blade according to claim 14, wherein the number of boundary layer control means (40) is provided in the airfoil region (34) only.

16. A wind turbine blade according to claim 14, wherein the number of boundary layer control means (40) is provided in the airfoil region (34) and the transition region (32).

17. A wind turbine rotor comprising a number, preferably two or three, of wind turbine blades according to claim 1.

18. A wind turbine comprising a number of blades according to claim 1.

19. A wind turbine comprising a wind turbine rotor according to claim 17.

20. A wind turbine blade according to claim 1, wherein the first sidewall (108; 208; 308; 408; 508; 608) or the second sidewall (110; 210; 310; 410; 510; 610) has a sharp edge between the first flow accelerating channel zone (122; 222; 322; 622) and the second channel zone (124; 224; 324; 624).

21. A wind turbine blade according to claim 1, wherein the first sidewall and the second sidewall of the first flow accelerating channel zone are convergent.

* * * * *